Feb. 3, 1959 — S. C. NELSON — 2,871,884
PULSE DAMPENING FEED HOSE
Filed Sept. 12, 1955 — 2 Sheets-Sheet 1
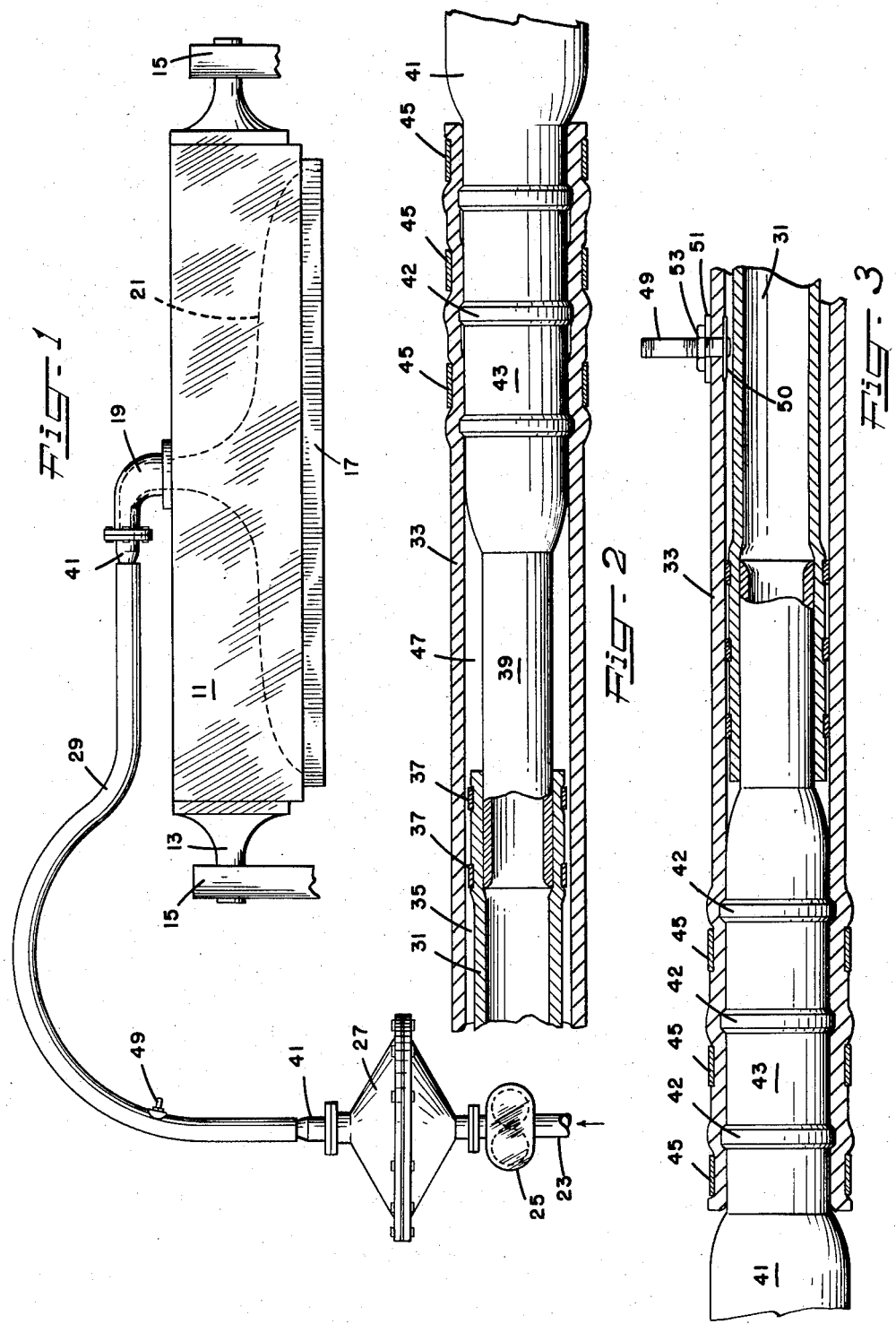

Feb. 3, 1959   S. C. NELSON   2,871,884
PULSE DAMPENING FEED HOSE
Filed Sept. 12, 1955   2 Sheets-Sheet 2
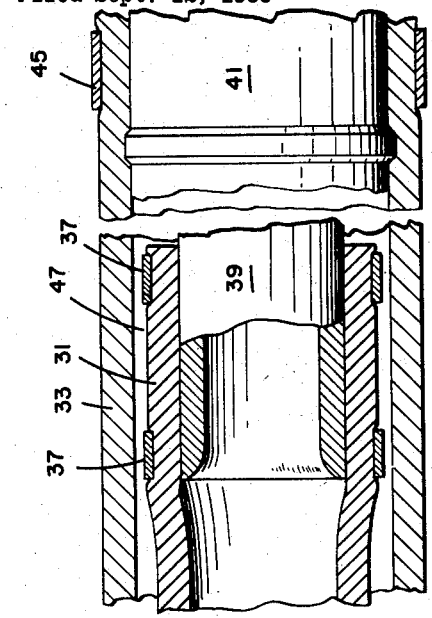
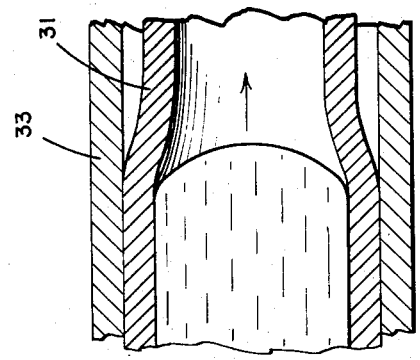
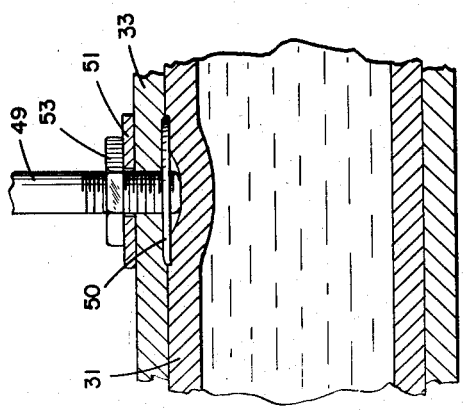

United States Patent Office 2,871,884
Patented Feb. 3, 1959

2,871,884

PULSE DAMPENING FEED HOSE

Seddon C. Nelson, Fredericksburg, Va., assignor to American Viscose Corporation, Philadelphia, Pa., a corporation of Delaware Application September 12, 1955, Serial No. 533,834

6 Claims. (Cl. 138—30)

The invention relates to a cellophane casting machine or the like and particularly to a feed hose for a casting machine nozzle.

In the conventional manufacture of films or foils, a suitable material such as viscose is extruded through an elongated orifice in the casting machine nozzle into a coagulating or regenerating bath. The nozzle is mounted for pivotal movement to and from operative position by means of trunnions, one of which is hollowed and operatively connected with a suitable stuffing box or packing gland to permit a continuous fluid flow therethrough, as more fully described, for example, in my copending United States patent application Ser. No. 267,866, filed January 23, 1952, now Patent No. 2,727,276. Delivery of the viscose to the nozzle is accomplished by a gear pump which forces the viscose through a filter unit having, at its inlet end, a pressure responsive hollow rubber ball for dampening pump pulsations. With this conventional apparatus, the stuffing box or packing gland creates piping alignment problems and provides various crevices and corners in which the film-forming viscose material can readily set-up or gel. As the nozzle is rotated, these gels are dislodged and seat themselves in the nozzle orifice causing splits in the film being formed and necessitate frequent stopping of the apparatus for cleaning. In addition to these above-noted disadvantages, the pressure responsive ball in the filter unit blocks a considerable area of the filter, and more important, loses its air in a comparatively short time and thus fails to effectively dampen pump pulsations. It is therefore an object of this invention to provide a generally improved and more satisfactory cellophane casting apparatus.

Another object is the provision of a feed hose for a casting machine nozzle which eliminates the use of packing glands, pressure responsive rubber balls for dampening pump pulsations and pipe alignment problems presently occasioned with existing and known film casting equipment.

Still another object is to provide a nozzle feed hose formed of outer and inner tubes, the latter of which is adapted to automatically adjust its cross-sectional opening to trap air or other fluid between the inner and outer tubes for dampening pump pulsations.

These and other objects and advantages of the invention will be apparent from the following description and accompanying drawing in which:

Fig. 1 illustrates the feed hose of the present invention interconnecting the casting machine nozzle and filter unit;

Fig. 2 is a longitudinal vertical section showing the connection between the nozzle and feed hose;

Fig. 3 is a view similar to Fig. 2 illustrating the connection between the filter unit and feed hose;

Fig. 4 is a fragmentary vertical view illustrating the action of the feed hose inner tube on the air inlet means in response to fluid pressure;

Fig. 5 is a view similar to Fig. 4 showing the reaction of the feed hose inner and outer tubes as the film-forming material passes therethrough; and Fig. 6 is an enlarged view of the structure shown in Fig. 2, with certain of the parts being broken away.

The invention, in general, is directed to a feed hose for use with a casting machine nozzle and includes a pair of coaxial telescoped tubes, the inner one being of resilient material, such as gum rubber, while the other one is formed of reinforced flexible material and is provided with fluid or air inlet means. The external diameter of the inner tube is substantially less than the internal diameter of the outer tube to provide a space between the tubes into which fluid, such as air, can be readily admitted through the inlet means. The outer tube of the feed hose extends beyond the ends of the inner tube and thus, when the tubes are secured to their respective connectors, a chamber or pocket is provided at the outlet end of the hose into which air is forced as hereinafter described. With no fluid flow through the feed hose, air is freely admitted through the inlet means to place the inner tube under atmospheric pressure. Fluid flow through the feed hose causes the inner tube to progressively expand and engage with the inner periphery of the outer tube which takes substantially all the load as the fluid passes therethrough. The expansion force of the inner tube first effects a closing of the inlet means thereby trapping air between the inner and outer tubes. Concomitantly with the fluid flow through the inner tubes, the trapped air is caused to travel toward and into the pocket or chamber at the outlet end of the feed hose and there serves to effectively dampen pump pulsations and facilitate a constant flow of fluid to enter the casting machine nozzle.

With reference to the drawings, Fig. 1 illustrates a casting machine spinning head or nozzle 11 pivotally supported by trunnions 13 positioned within the fixed bearings 15. The nozzle includes a pair of spaced lips 17 forming an elongated orifice, through which the film-forming material is extruded, and an inlet elbow 19 through which the viscose or other suitable material is admitted to the nozzle along a path as illustrated by the dotted lines 21. Any conventional means may be provided for temperature regulation of the film-forming material passing through the nozzle, as more fully described in my above-noted copending application. Fluid flow to the nozzle 11 from the supply pipe 23 is accomplished by the gear pump 25 which forces the film-forming material through the filter unit 27 and then through the feed hose 29 of the present invention. The gear pump 25 is of conventional construction, while the filter unit 27 is the same as presently employed with the exception that the customary pressure responsive hollow rubber ball at the inlet end can be eliminated as heretofore explained.

The feed hose 29, as best seen in Figs. 2–6, includes a resilient inner tube 31 telescoped within a reinforced flexible outer tube 33. The relative diameters of the inner and outer tubes 31 and 33 are such as to provide an air space 35 between these tubes when they are in their relaxed or untensioned position as illustrated in Figs. 2 and 3. At its inlet and outlet ends, the inner tube 31 is connected by band clamps 37 to the reduced portions 39 of the fittings or stems 41. The outer tube 33, in its telescoped position over the inner tube, is similarly connected at its opposite ends to the enlarged portions 43 of the fittings 41 by means of band clamps 45. Any suitable type of ridges or projections 42 may be provided onto the external periphery of the fitting portion 43 to provide a tighter joint and to prevent the ends of the outer tube from sliding off the fittings 41, either accidentally or under increased fluid pressure in the feed hose. It will be noted from the structure thus far described, that the end connections of the outer tube and the fittings 41 are located outwardly or beyond the corresponding end connections of the inner tube so that a chamber or pocket 47 is provided beyond the end of the inner tube at the outlet end of the feed hose. Adjacent the inlet end of the feed hose, a tubular stem 49 passes through the outer hose 33 and is secured thereto in a fluid-tight manner by flange 50, washer 51 and nut 53.

After the casting machine is shut down or before any viscose is passed through the feed hose, the inlet stem 49 admits air into the space 35 and thus the inner tube 31 is in its untensioned or collapsed position under atmospheric pressure. As the gear pump 25 delivers fluid through the filter unit 27 and then into the inner tube 31 of the feed hose 29, the fluid pressure causes the flexible inner tube 31 to progressively expand, see Fig. 4, and engage with the inner periphery of the outer tube 33 as the fluid flows therethrough. As the inner tube 31 expands, its wall engages with the lower end of the stem 49 and thereby prevents further entry of air into the space 35. Once the air inlet means is closed, the progressive movement of the fluid through the inner tube 31 effects a continuing expansion of the inner tube 31 along its length thus forcing the air trapped in the space 35 to travel toward the chamber 47 (see Figs. 5 and 6) at the outlet end of the feed hose where it functions to dampen pump pulsations during the normal period of the operation. At the inlet end of the feed hose, the higher pressure of the fluid enables the inner tube 31 to completely fill the outer tube, while at the outlet end of the feed hose the contained air in the chamber 47 taken with the resilient action of the inner tube 31 balances the internal pressure of the fluid, which equals the inlet pressure less the pressure drop of the fluid as it travels through the hose. As the fluid pressure varies when the gear teeth of the pump 25 contact each other, the contained air in the chamber 47 serves to smooth out or dampen the pulsating fluid flow and thus prevents the nozzle from extruding a sheet having varying thicknesses along its length.

When the fluid flow through the feed hose is stopped, the inner tube 31 assumes its normal untensioned position thereby allowing the contained air in the chamber 47 to enter into the space 35 and permitting additional air to be pulled through the stem 49 to replace that which may have escaped through the wall of the outer tube during normal operation.

From the above described invention, it is apparent that the normal pulsating fluid flow is more effectively dampened than by means heretofore known. In addition, the structure described eliminates the use of the conventional pressure responsive hollow rubber ball which not only blocked out a considerable area of the filter but which also lost its effectiveness far sooner than the normal life of the filter itself.

It is seen from the above description that the objects of the invention are well fulfilled by the structure described. The description is intended to be illustrative only and it is to be understood that changes and variations may be made without departing from the spirit and scope of the invention as defined by the appended claims.

I claim:

1. A pulse dampening feed hose including first and second stem members serving as a fluid inlet and outlet means respectively, a resilient fluid conducting tube connected at its opposite ends to said first and second stem members and having an imperforate wall, a second tube telescoped over said first tube and connected at its ends to said first and second stem members, said first and second tubes being of such relative size as to provide a space therebetween within which said first tube expands into engagement with the internal wall of said second tube when fluid is introduced therein, and inlet means carried by said second tube adjacent said first stem and opening into said space, said inlet means admitting fluid into said space when said first tube is in an untensioned condition and being closed as said first tube is expanded thereagainst.

2. A pulse dampening feed hose including first and second stem members serving as inlet and outlet means respectively, a resilient liquid conducting tube connected at its opposite ends to said first and second stem members and having an imperforate wall, a second tube enclosing said first tube and being spaced therefrom, said second tube connected to said first and second stem members and being of greater length than said first tube to provide a fluid receiving pocket adjacent the outlet of said hose when said first tube is expanded, under fluid pressure, into engagement with the internal wall of said second tube, and means for admitting fluid into the space between said first and second tubes when said first tube is in an untensioned condition and being closed as said first tube is expanded thereagainst.

3. A construction as defined in claim 1 wherein at least one end of said second tube extends beyond the corresponding end of said first tube adjacent to said second stem member.

4. A construction as defined in claim 1 wherein said stems are of tapered construction and said second tube has one of its ends connected to an enlarged portion of said second stem member to provide an air chamber at the outlet end of said hose between said first and second tubes.

5. A construction as defined in claim 2 wherein said second tube is non-resilient and flexible.

6. A construction as defined in claim 2 wherein said second stem member is of tapered construction, having a reduced end portion to which one end of said first tube is connected and an enlarged body portion to which one end of said second tube is connected.

References Cited in the file of this patent

UNITED STATES PATENTS

| | | |
|---|---|---|
| 1,579,891 | Sandoz | Apr. 6, 1926 |
| 1,958,009 | McKee | May 8, 1934 |
| 2,020,633 | Dannenberg | Nov. 12, 1935 |
| 2,156,296 | Kline | May 2, 1939 |
| 2,583,231 | Ragland | Jan. 22, 1952 |
| 2,609,001 | Hebard | Sept. 2, 1952 |
| 2,664,049 | Coberly | Dec. 29, 1953 |
| 2,712,831 | Day | July 12, 1955 |
| 2,735,642 | Norman | Feb. 21, 1956 |
| 2,760,518 | Peet | Aug. 28, 1956 |

FOREIGN PATENTS

| | | |
|---|---|---|
| 388,871 | Great Britain | Mar. 9, 1933 |